(12) United States Patent
Hilberer

(10) Patent No.: US 6,540,308 B1
(45) Date of Patent: Apr. 1, 2003

(54) ELECTRONIC COMPRESSED-AIR PROCESSING SYSTEM

(75) Inventor: Eduard Hilberer, Hockenheim (DE)

(73) Assignee: Knorr-Bremse Systeme für Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/529,029

(22) PCT Filed: Jul. 23, 1999

(86) PCT No.: PCT/EP99/05266

§ 371 (c)(1),
(2), (4) Date: Jun. 27, 2000

(87) PCT Pub. No.: WO00/07863

PCT Pub. Date: Feb. 17, 2000

(30) Foreign Application Priority Data

Aug. 6, 1998 (DE) .......................................... 198 35 638

(51) Int. Cl.[7] ........................... B60T 17/02; B60T 13/00
(52) U.S. Cl. ..................... 303/6.01; 303/119.1; 303/60; 137/115.19
(58) Field of Search ....................... 303/6.01, 60, 118.1, 303/119.1, 9, 13–18; 137/115.19, 115.23, 118.06

(56) References Cited

U.S. PATENT DOCUMENTS

| | | | | |
|---|---|---|---|---|
| 5,566,717 A | * | 10/1996 | Robert | ....................... 137/883 |
| 5,678,900 A | * | 10/1997 | Blanz | ........................ 303/6.01 |
| 6,015,155 A | * | 1/2000 | Brookes et al. | .......... 280/5.504 |
| 6,041,808 A | * | 3/2000 | Blanz | .................... 137/118.06 |
| 6,089,831 A | * | 7/2000 | Bruehmann et al. | ........ 417/282 |

FOREIGN PATENT DOCUMENTS

| | | |
|---|---|---|
| DE | 195 15 895 A1 | 10/1996 |
| DE | 19544621 C1 * | 1/1997 |
| DE | 196 49 498 C1 | 2/1998 |
| DE | 19700234 C1 * | 4/1998 |
| DE | 19710059 C1 | 7/1998 |
| DE | 19710814 C1 | 7/1998 |
| EP | 0 689 117 A2 | 12/1995 |
| WO | WO-9634785 A * | 11/1996 |
| WO | 98/47751 | 10/1998 |

* cited by examiner

*Primary Examiner*—Jack Lavinder
*Assistant Examiner*—Melody M. Burch
(74) *Attorney, Agent, or Firm*—Crowell & Moring LLP

(57) ABSTRACT

A compressed-air processing system, notably for motor vehicles, includes, in a housing, an electromagnetic pressure regulator and a multicircuit safety valve having at least one load circuit connected to it. Each load circuit can be locked separately by an assigned pressure control unit. Reliable and economical operation of the system is achieved by positioning a pressure limiter between at least one of the pressure control units and the pressure regulator output and by the fact that in the zero-current state, the pressure limiter acts on a supply hole for the control unit so as to limit the output pressure to a defined value.

13 Claims, 3 Drawing Sheets

ELECTRONIC COMPRESSED-AIR PROCESSING SYSTEM

BACKGROUND AND SUMMARY OF THE INVENTION

The present invention relates to a compressed-air processing system having, in a housing, an electromechanical pressure regulator, preferably an air dryer cartridge, and a multicircuit safety valve having at least one load circuit connected to it. Each load circuit can be locked separately by means of an assigned pressure control unit.

Compressed-air processing systems of known construction utilize compressed air provided by air compressors for operation of pneumatic service brakes, of parking brakes, of other compressed-air operated consuming devices as well as, more recently, of pneumatic suspensions, particularly in utility vehicles. Electronically controlled compressed-air processing systems are used to control rapidly operable solenoid valves according to presettable parameters. Because of the susceptibility of the electronic system and the unavailability of the motor vehicle connected with malfunctioning, it is desirable that the compressed-air processing system function also when the electronic system is failing.

German Patent Document DE-OS 195 15 895 A1 shows a compressed-air procuring arrangement having a compressed-air processing system which feeds compressed air supplied by a compressor by way of an air dryer to a four-circuit safety valve, the valve members of the four-circuit safety valve being controllable by way of assigned pilot valves. The pilot valves of a pressure regulator unit are controlled by a central electronic unit which reacts to the pressure detected by-a pressure sensor in a service brake circuit. The compressed air for the pressure regulator unit and the pneumatic control of the valve members of the four-circuit safety we valve is selectively taken from the service brake circuit or from the delivery pipe behind the air dryer. In the event of failure of the service brake circuit, the valve members must be supplied with control pressure exclusively from the delivery pipe of the pressure regulator. Consequently, a permanent load movement of the compressor is required, and compressor damage can occur much more rapidly because the compressor must permanently deliver against the safety valve pressure and, therefore, is at a risk of overheating. Another inadequacy of the known arrangement is that, in the event of the permanent delivery, the air dryer cartridge will not become pressureless and therefore is no longer regenerated. After a certain time has passed, humidity can penetrate into the brake circuits. Finally, the air dryer is also not regenerated in a controlled manner as a function of the detected air humidity, but, in the case of each electronically triggered pressure compensation between two brake circuits, air flows out permanently by way of a fixedly installed bypass. As a result, the volume to be delivered and the corresponding energy consumption are increased.

European Patent Document, EP-OS 0 830 997 A2 describes an energy supply arrangement for an air brake system of vehicles, in the case of which the pressure control units assigned to-one brake circuit respectively are switched by way of pilot valves which can be controlled by an electric control unit, and in the case of which a cascade-type presetting of the closing pressure of the pressure control units permits a successive filling of the brake circuits in the zero-current operation in the cascade sequence. Also, in this air brake system, compressor damage may occur in the zero-current operation, and a regeneration of an air dryer cartridge is not provided. The access to the brake circuit of the spring brake system takes place by way of an on/off shut-off valve only when a minimum pressure has been built up in the service brake circuits. This on/off shut-off valve permits no regulating or controlling of the pressure.

German Patent Document DE-PS 195 44 621 C1 shows a compressed-air procuring arrangement having a compressed air processing system which has an air dryer, a pressure regulator and a multicircuit safety valve with connected load circuits with electronically controllable overflow valves which shut the circuits off. Because the air suspension results from the same approach flow space from which the load circuits also originate, it is not possible to supply the air suspension with a higher pressure than the brake circuits. Furthermore, it is not possible to continue to operate the pressure regulator pilot control in the zero-current operation. In the zero-current operation, it is also not possible to regenerate the air dryer cartridge. It also should be noted that a fairly long time goes by for the shutting-off of the overflow valves because a large switching volume is required. As a result, the possibility is eliminated of sensitive ventilation in the circuits with a lacking storage tank (in practice, for example, the circuit for the service brake system), which may result in overcontrolling.

It is an object of the invention to provide a compressed-air processing system of the type mentioned above which can be operated in a reliable manner and at reasonable cost.

According to the invention, this object is achieved by arranging a pressure limiter between at least one of the pressure control units and the pressure regulator output, and, in the zero-current state, by limiting a supply hole for the at least one pressure control unit to a defined output pressure with the pressure limiter.

By means of the compressed-air processing system, it is advantageously possible to operate by means of different pressure levels for the safety-relevant brake pressure supply and the air suspension. In the energized operation of the compressed-air processing system, the various pressures are freely programmable and can be addressed individually by the operation or excitation of correspondingly provided solenoid valves. Thus, it is possible, for example, as a reaction to measured pressure values in the load circuits, with respect to pressure reduction, to charge in a targeted manner individual circuits at a sequence which can be defined by priorities. As a result, in a targeted manner, the charging of in each case only one circuit can also be provided which is then brought correspondingly faster to a desired pressure value. This ensures a fully electronic control of the compressed-air generating system which, furthermore, as a reaction to other measured values, such as coasting phases of the motor vehicle, overload of the compressor, or leakages in a certain circuit, can correspondingly separate individual circuits in order to return to a condition which is required for the safe operation of the motor vehicle. Likewise, as a reaction to detected humidity values in the compressed air and/or in an air dehydration cartridge, the control can trigger intermediate regenerations in a targeted manner in that, in the area of the air dryer cartridge, a flow reversal with already dried air is triggered in a targeted manner in order to regenerate the cartridge.

The control lines are expediently connected such with the valves triggering the regeneration that, during the energized operation, the pressure limiter is always held open. The supply hole for the circuits, which is arranged on the other side of the pressure limiter, and the pressure regulator output hole arranged on this side of the pressure limiter are then subjected to the same pressure, and the electronic control system determines, by defining the circuits to be charged, the supply of the compressed air to the circuits as well as the intermediate regenerations to be carried out. The intermediate regenerations are preferably triggered by the control for reasons of safety also after certain time intervals have elapsed.

In contrast, in the zero-current condition, after a preset value has been reached in the supply hole, the pressure limiter carries out an off-control and separates the supply hole from the pressure regulator output hole in the manner of a dynamic pressure stage. It therefore becomes possible, if an overflow valve of an air suspension is further developed correspondingly, which air suspension is connected with the pressure regulator output pipe, to first provide a pressure in the pressure regulator output hole which exceeds the switch-off pressure of the pressure limiter, and a higher pressure for the response of the overflow valve of the air suspension. This ensures that, even in the event of a failure of the electronic control, the safety relevant circuits are filled first. This also permits the further development of the air suspension without a separate air storage tank which reduces the cost of this component.

The compressed-air processing system according to the invention also advantageously permits the controlling of the pressure regulator also in the case of a limited circuit pressure which is still below the switch-off pressure. On the other hand, in the zero-current state, it is ensured by the response of the pressure limiter that, after the off-control pressure of preferably approximately 8.5 bar has been exceeded, no unlimited delivery takes place against the safety valve pressure. As a result, a compressor will reach the pressure regulator switch-off pressure more rapidly and can therefore be rendered inoperative correspondingly, which increases the life time of the compressor and reduces the energy consumption.

An electronic rapid switch-off possibility of the compressor is preferably also provided, for example, by way of a 3/2-way valve which, in the event of the electronically triggered regeneration is ventilated (or optionally magnetically excited) and is preferably also ventilated in the event of a pneumatic bleeding of the pressure regulator.

A solenoid valve for controlling the pressure regulator is expediently provided. The pressure regulator solenoid valve is preferably constructed as a 3/2-way valve and ventilates, when excited, a control line which, on the one hand, ventilates the pressure regulator such that the compressed air delivered by an air compressor is bled and, on the other hand, ventilates a piston of the pressure limiter such that this pressure limiter remains in its open position. In connection with the air bleeding of the pressure regulator, preferably a pneumatic 2/2-way valve is also ventilated which triggers the rapid switch-off of the air compressor delivering the inflowing compressed air. After the end of the excitation, a spring restores the solenoid valve of the pressure regulator, and the ventilated control line is bled and is therefore pressureless so that the pneumatic valves which follow in a cascade-type manner can also return into their starting position.

Furthermore, the compressed-air processing system advantageously comprises a solenoid regeneration valve which is constructed as a 3/2-way valve and triggers by excitation, on the one hand, a regeneration flow in the direction of an air dryer cartridge of the compressed-air processing system and, on the other hand, ventilates another piston of the pressure limiter and therefore fixes it in the open position. After the end of the excitation, a spring restores the solenoid valve of the pressure regulator and the ventilated control line is bled and thus becomes pressureless. It is understood that the solenoid regeneration valve can expediently be synchronized with the solenoid valve of the pressure regulator such that the solenoid regeneration valve will be excited only when the solenoid valve of the pressure regulator is also excited in order to permit the compressed air reversal in the air dryer cartridge. In contrast, the solenoid valve of the pressure regulator can also be controlled by the electronic control system without the necessity of a regeneration. It is possible to construct the two above-mentioned solenoid valves also in a common component, in which case only a synchronous pressure regulator ventilation/regeneration operation will then still be possible.

The compressed-air processing system preferably comprises a pilot valve for controlling the pressure regulator, which pilot valve responds independently of the electronic control system. As a threshold value for the response of the pilot valve, a pressure is expediently set by way of a preferably adjustable spring, in the case of which the control valve switches which is constructed as a pneumatic (mechanical) 3/2-way valve. When the preset pressure is exceeded, the pilot valve ventilates, by way of a control hole, the pressure regulator and carries out an off-control of the pressure regulator by bleeding. The control line preferably also controls a regeneration valve preferably constructed as a 2/2-way valve against its spring-loaded restoring force, whereby the regeneration of an air dryer cartridge can be triggered. According to a preferred construction, the regeneration valve is simultaneously constructed as a piston for the pushing-open of the pressure regulator which, at the end side, is ventilated by the control line and is simultaneously switched and displaced in order to rapidly and reliably synchronize the off-controlling of the pressure regulator and the regeneration of the air cartridge. The switch-off pressure of the pilot valve is expediently set higher than the switch-off values stored in the electronic control system, so that the pneumatic switch-off acts only as a backup position of the electronic switch off and does not undesirably interfere with the latter.

By means of the above-explained further developments of the invention, it is possible to fully electronically control the compressed-air processing system according to the invention and to nevertheless ensure the operational readiness in the event of the failure of the electronic system.

Additional characteristics and advantages of the invention are contained in the following description and in the subclaims.

The invention will be explained in the following by way of illustrated embodiments and with reference to the enclosed drawings.

DESCRIPTION OF THE PREFERRED EMBODIMENTS

Figure 1:
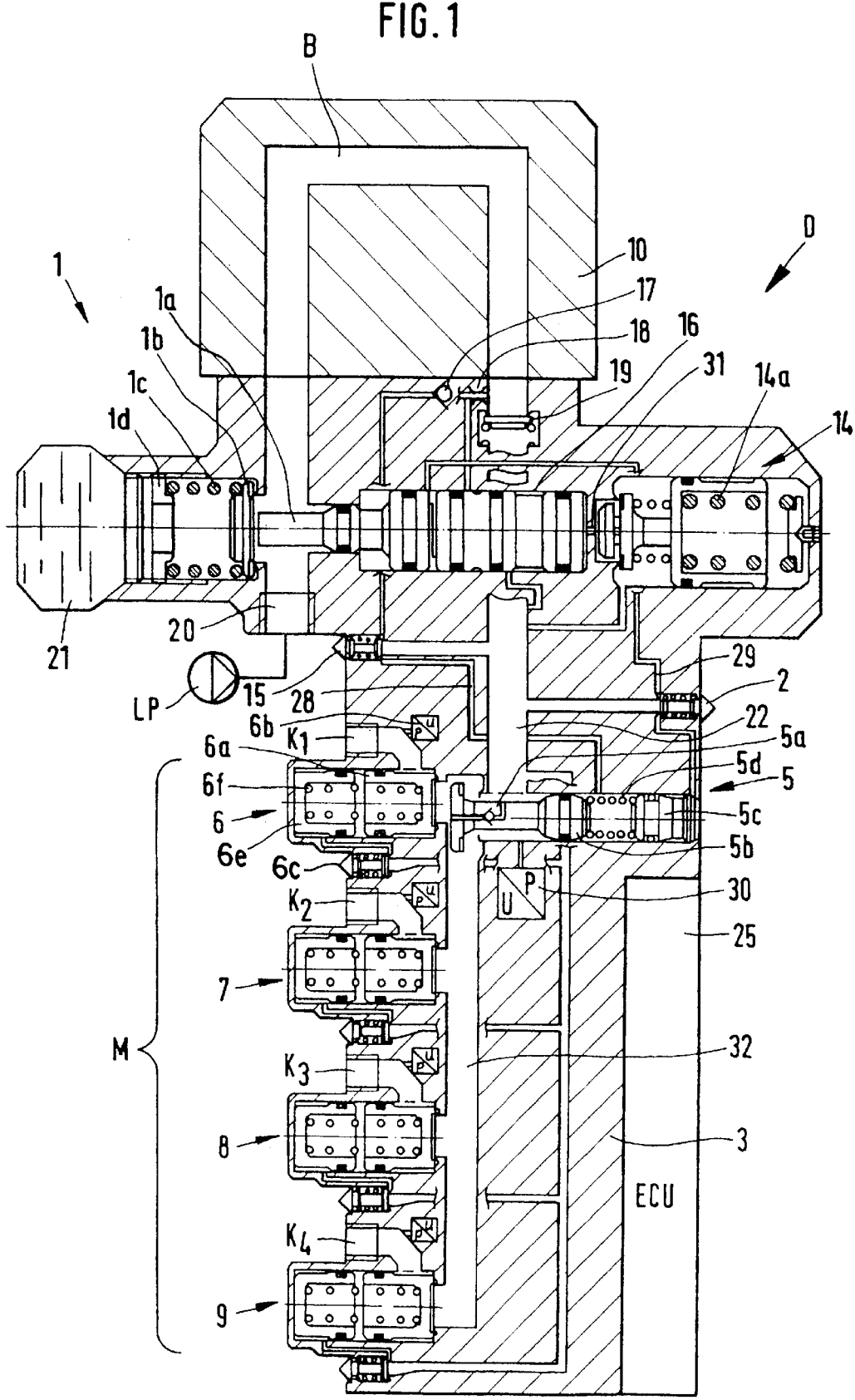
FIG. 1 is a schematic sectional view of a compressed-air processing system according to the invention.

The compressed-air processing system D according to the invention illustrated in FIG. 1 has, in a common housing 3, function elements for the operation, for example, on the pneumatic brake system of a truck. The compressed-air processing system D has a filler connection 20 to which a line, which is not shown, is connected for the compressed-air supply, which line extends through a schematically illustrated air compressor LP. A hole B guides the filler connection 20 through an air dryer cartridge 10. The air dryer cartridge 10 is used for dehumidifying the air supplied through the air compressor LP.

The compressed air introduced into the filler connection 20 first passes through an electromechanical pressure regulator 1 which operates as a shut-off valve of the filler connection with respect to the air bleed connection 21. The pressure regulator 1 is prestressed in the closed position by the force of a spring 1c which is supported on a disk 1d, which is open for the bleeding, and against a piston 1b which forms the boundary of the filler connection 20. Coaxially with the disk 1d, a tappet member or piston 1a is arranged which is used for the mechanical pushing open of the piston 1b while overcoming the restoring force of the spring 1c, which will be explained in detail below.

A return valve 19 locks the area of the filler connection 20 with respect to a pressure regulator output pipe 22 arranged downstream, so that, during the bleeding of the filler connection 20, no pressure drop occurs in the pressure regulator output pipe 22. In parallel to the return valve 19, an expansion hole 18 branches off the filler connection 20, which expansion hole 18 permits, for the regeneration of the filter cartridge 10, the passing through of regeneration air, thus dry air. On the one side, the expansion hole 18 is connected by way of a line with an output of a regeneration valve 16 constructed as a pneumatic closing valve and prestressed in the closed position and, on the other side, is connected with an output of a solenoid regeneration valve 15 constructed as an electromagnetic 3/2-way valve and prestressed in the closed position. When the solenoid regeneration valve 15 is excited, compressed air can pass from the pressure regulator output pipe 22 through the return valve 17 and can flow through the expansion hole 18 into the filter cartridge 10 (thus against the flow direction of the compressed air fed by the air compressor LP), whereby the drying agent contained in the filter cartridge is dehumidified and thus regenerated.

A pressure sensor 30 is arranged at the pressure regulator output hole 22, which pressure sensor 30 measures the pressure in the pressure regulator output hole 22 and supplies it to a schematically illustrated electronic control unit 25. The electronic control unit 25 controls a pressure regulator solenoid valve 2 which is constructed as an electromagnetic 3/2-way valve and which is connected on the input side with the pressure regulator output hole 22 and, if actuated, emits compressed air outside the compressed air processing system. The pressure regulator solenoid valve 2 connects a control line 29, on the one side, with the pressure regulator 1 constructed as a switching/safety valve and, on the other side, with a pressure limiter 5 which will be explained in detail in the following.

The above-mentioned pressure limiter 5 is connected to the pressure regulator output hole 22. In the present embodiment, a spring 5d, which is supported on a pressure limiter control piston 5c, on the one side, and on a pressure limiter piston 5b, on the other side, prestresses the valve member of the pressure limiter 5 in the opening direction. The pressure limiter 5 fluidically separates a supply hole 32 connected on the output side from the pressure regulator output hole 22.

The supply hole 32, in turn, supplies a multicircuit safety valve M. The multicircuit safety valve M has a plurality of pressure control units 6, 7, 8, 9 which will be described in detail and which each allow compressed air from the supply hole 32 to access an assigned supply circuit K1, K2, K3 and K4. In the present embodiment, circuit K1 is assigned to pressure control unit 6; circuit K2 is assigned to pressure control unit 7; circuit K3 is assigned to pressure control unit 8; and circuit K4 is assigned to pressure control unit 9. Circuits K1 and K2 are used for the compressed-air supply of service brake circuits, which are not shown in detail, and comprise, for example, compressed-air storage tanks and other customary components. The parking brake system FBA is connected, for example, to circuit K3, while circuit K4 is provided for the connection of accessories.

The pressure control units 6 to 9 are each built according to the same construction principle, which will therefore be explained, as an example, by means of the pressure control unit 6. A pressure sensor 6b is assigned to pressure control unit 6 on the side of the connection piece of circuit K1. The measured pressure value of .this pressure sensor 6b is supplied to the electronic control unit 25. The compressed air in the supply hole 32 is separated from circuit K1 by an overflow valve 6a. The overflow valve 6a has a switching piston 6e and an overflow valve spring 6f which, controlled by a solenoid valve 6c, can be ventilated or bled. In the ventilated condition, the overflow valve spring 6f is compressed and the supply hole 32 is connected with circuit K1. The solenoid valve 6c must be excited for ventilating the overflow valve spring 6f and is otherwise preset for bleeding the switching piston by means of spring force. The parts 7a–7f, 8a–8f and 9a–9f, which are designated according to parts 6a–6f, with respect to their construction and function, can be compared with the described parts 6a–6f and, in order to avoid repetitions, will therefore not be described individually. Since circuits K1 and K2 are both service brake circuits, which are designed for the same pressure value, it is possible to save a solenoid valve 6c or 7c, and provide a common solenoid valve for the two overflow valves 6a and 7a.

When the above-mentioned pressure regulator solenoid valve 2 and the regeneration solenoid valve 15 are switched off, the pressure limiter piston 5b limits the pressure in the central supply hole 32 as soon as a pressure has been reached which is higher than the value defined by the spring 5d and the compensated piston diameter.

A return valve 5a is preferably constructed concentrically to the pressure limiter 5, which return valve 5a can let compressed air flow out of the supply hole 32 in the direction of the pressure regulator output hole 22 and is prevented either by the pressure regulator solenoid valve 2 or by the regeneration valve 15 in the case of a corresponding flow from limiting pressure in the opposite direction.

The tappet valve 1a is displaced by actuating a pilot valve 14 constructed as a mechanical 3/2-way valve with a surface hysteresis. The pilot valve 14 is prestressed by means of an adjustable spring 14a in the bleeding position, in which the tappet member 1a subjects the piston 1b to no opening movement. When the pressure in the pressure regulator output hole 22 in the zero-current operation of the system reaches the value which can be preset by the spring 14a, the spring 14a is compressed and the pressure regulator pilot valve 14, by way of a hole 31, ventilates the on/off valve 16, by means of which the release of a backup regeneration is triggered in that the switching piston 1a is displaced against the prestressing of the spring 1c of the pressure regulator 1 so that the pressure regulator valve 1 opens and the air compressor LP can deliver into the open air in a pressureless manner.

It is optionally possible to increase the prestressing force of the spring 14a in the energized operation, in addition, by the path of a blocking piston which prevents the valve 14 from responding when the force of the spring 14a is exceeded. The blocking piston may have a two-circuit construction and can be acted upon, on the one hand, by way of a regeneration blocking line by the regeneration solenoid valve and, on the other hand, by way of a pilot line by the solenoid circuit control valve 6c, which was described above. In the zero-current operation of the system D, two lines remain pressureless and the pressure regulator pilot valve 14 can operate freely, that is, it is not affected by the stroke of the blocking piston.

In the energized operation of the system D, when the switch-off pressure is reached, which is sensed by the pressure sensor 30 in the pressure regulator output hole 22, the pressure regulator solenoid valve 2 is controlled and excited by the electronic control system 25, whereby the line 29 ventilates the switching piston 1a. The ventilated switching piston 1a presses the safety valve 21 open, and the air compressor LP delivers into the open air. It is also possible to initiate the electric regeneration in the energized operation also by the common electronic control system 25 in that the regeneration solenoid valve 15 is excited.

The further development of the pilot valve 14 therefore advantageously permits a regeneration of the air dryer cartridge 10 in the energized as well as in the zero-current condition, whereby the operation of the compressed-air procuring system D is ensured in a safe manner and at reasonable cost.

An internal CAN (Controlled Area Network) 24 is connected to the electronic control unit 25 and is connected by way of a CAN data bus line 26 to the CAN network pertaining to the motor vehicle. It is therefore possible to transmit data, such as pressure values in the service brake circuit, and similar data detected by the electronic control system 25 to additional electronic control systems installed in the motor vehicle. These optionally cause the actuating of optical warning signals. In addition, the electronic control system may also be connected with temperature measuring elements and control a heater 27 in the housing 3.

The method of operation of the compressed-air processing system D according to the invention will be explained in the following.

After the motor vehicle is switched on, compressed air is pressed into the central supply hole 32 by way of the filler connection 20 through the air dryer cartridge 10 and the return valve 19 as well as the pressure limiter 5. The supply hole 32 supplies the pressure control units of circuits K1 to K4. By way of the pressure sensors 6b–9b, the electronic control system 25 measures the circuit pressures in circuits K1–K4. As a result of the targeted excitation of the corresponding solenoids 6c–9c, the electronic control system 25 can fill the circuits K1–K4 in a targeted manner in a desired sequence until a programmed desired final pressure exists. In the event of a leakage in one of the circuits, the solenoid valve pertaining to the circuit can be excited in a targeted manner for closing the leaking circuit with respect to the supply hole 32.

If, during the first filling phase of the system, because of the measured air humidity, a regeneration of the air dryer cartridge 10 becomes necessary, the control 25 causes the excitation of the pressure regulator solenoid valve 2. The pressure of the pressure regulator output hole 22 is therefore admitted to the control line 29, whereby the piston 1a causes the pushing-open of the piston 1b of the pressure regulator 1. Simultaneously, the regeneration solenoid valve 15 is excited, whereby compressed air can flow from the pressure regulator output hole 22 by way of the return valve 17 and the expansion hole 18 into the air dryer cartridge 10 and regenerates the latter (intermediate regeneration). The excited regeneration solenoid valve 15, as a result of the action of the pressure limiter control piston 5c upon the line 28, pushes open the pressure limiter 5, and remains excited during the regeneration. After the switching-off of the regeneration solenoid valve 15, the pressure regulator solenoid valve 2 takes over this task by acting upon the line 29 and the pressure limiter piston 5b. Thus, it is ensured that, if the system is electrically intact, the pressure limiter 5 remains continuously inoperative, whereby a complete electronic control (and regulating) of the compressed-air processing system D based on the control 25 is permitted.

In the event of a zero-current operation or in the event of a failure of the control, the system D according to the invention nevertheless permits a safe operation. After the switching-on of the motor vehicle, compressed air is delivered into the central supply hole 32 by way of the filler connection 20 through the air dryer cartridge 10 and the return valve 19 as well as the pressure limiter 5. When the opening pressure of the overflow valves 6 to 9 is reached, they will open (independently of the then absent excitation of the solenoid valves 6c–9c) and the circuits are ventilated one after the other. The control lines 28, 29 are always pressureless so that the pressure limiter 5 can operate freely. When a preset pressure limiter pressure of, for example, 8.5 bar is reached in the supply hole 32, the pressure limiter 5 will carry out an off-control. Thus the circuits K1–K4 are limited to this pressure. As a result, it is advantageously possible to construct an air suspension originating from the pressure regulator output hole 22 without a separate storage tank. As a result, by means of the selected adjustment of the pneumatic valves, a secure filling sequence of the circuits K1 to K4 can be selected. The pressure limiter 5 operates in the manner of a preram stage which allows an air suspension originating from the pressure regulator output hole 22 to be filled at a higher pressure than the operating circuits K1–K4.

The switch-off pressure of the pressure regulator 1 which can be adjusted at the spring of the pressure regulator pilot valve 14 defines the pressure in the pressure output hole 22 at which the line 31 is ventilated and the regeneration valve 16 is actuated. As a result, dry compressed air flows out of the pressure output pipe 22 through the valve 16 constructed as a 2/2-way valve and the expansion hole 18 back into the air dryer cartridge 10 and dries the dehumidifying media. By the actuating of the piston 1a, the pressure regulator 1 is simultaneously bled. The displacement of the piston 1a preferably takes place in that a piston surface of the concentrically arranged valve 16 is acted upon at the end side and is thus displaced, and the piston 1a, which is mechanically and/or mechanically coupled with the valve 16, presses upon the flap 1b against the restoring force of the spring 1c and bleeds the connection 20. This method of operation is space-saving and furthermore requires only very short filling periods and therefore ensures high response rates.

The return valve 5a advantageously allows a bypassing of the valve 5c, if, while the pressure limiter 5 is controlled off, a limited return flow of the supply hole 32 and of the pressure control units 6 to 9 is not possible. As an alternative, the return valve 5a can also have a selectively controllable construction so that it is set to be inoperative—for example, preferably in the energized operation.

Figure 2:
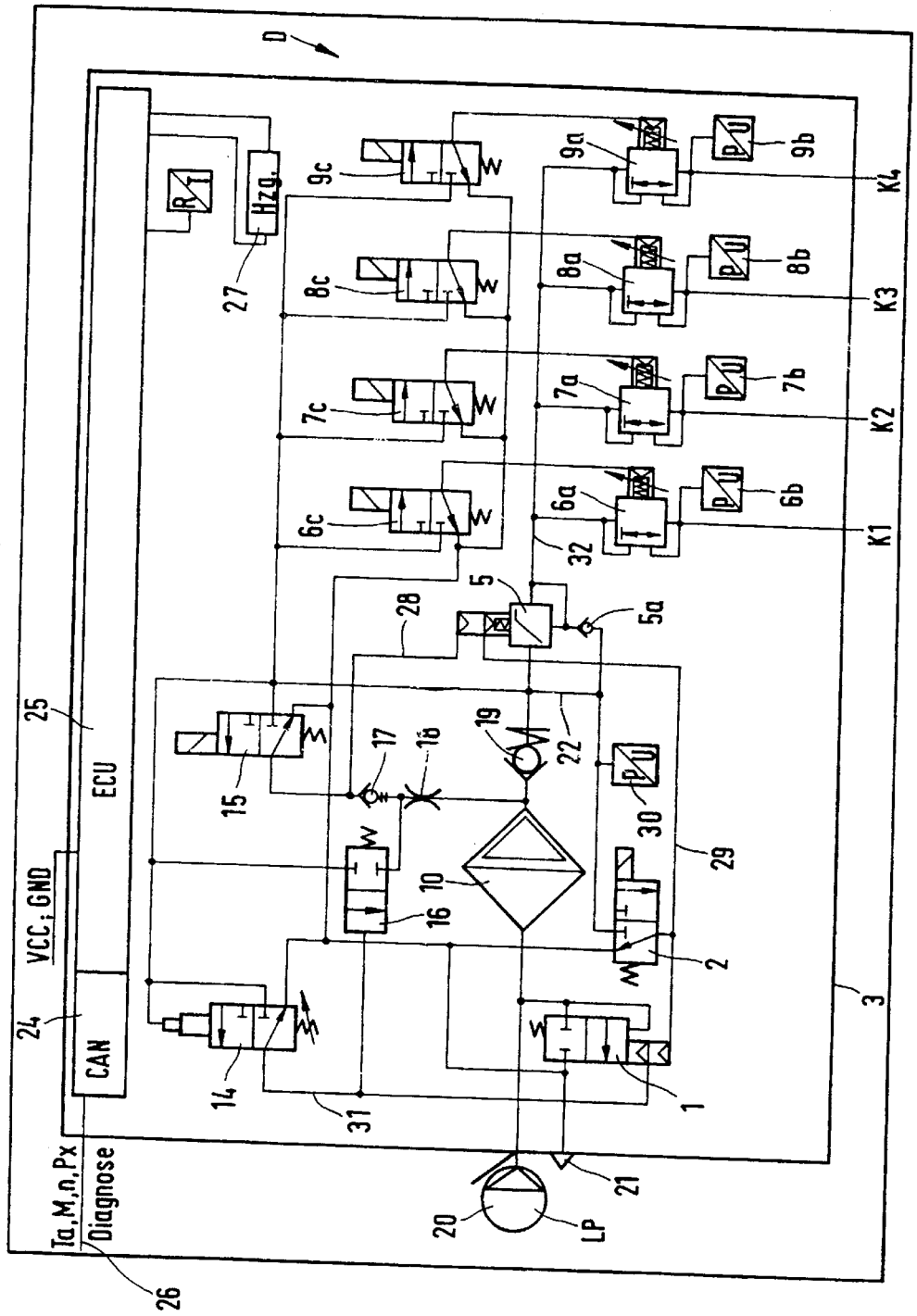
FIG. 2 is a connection diagram of the compressed-air processing system of FIG. 1.
Figure 3:
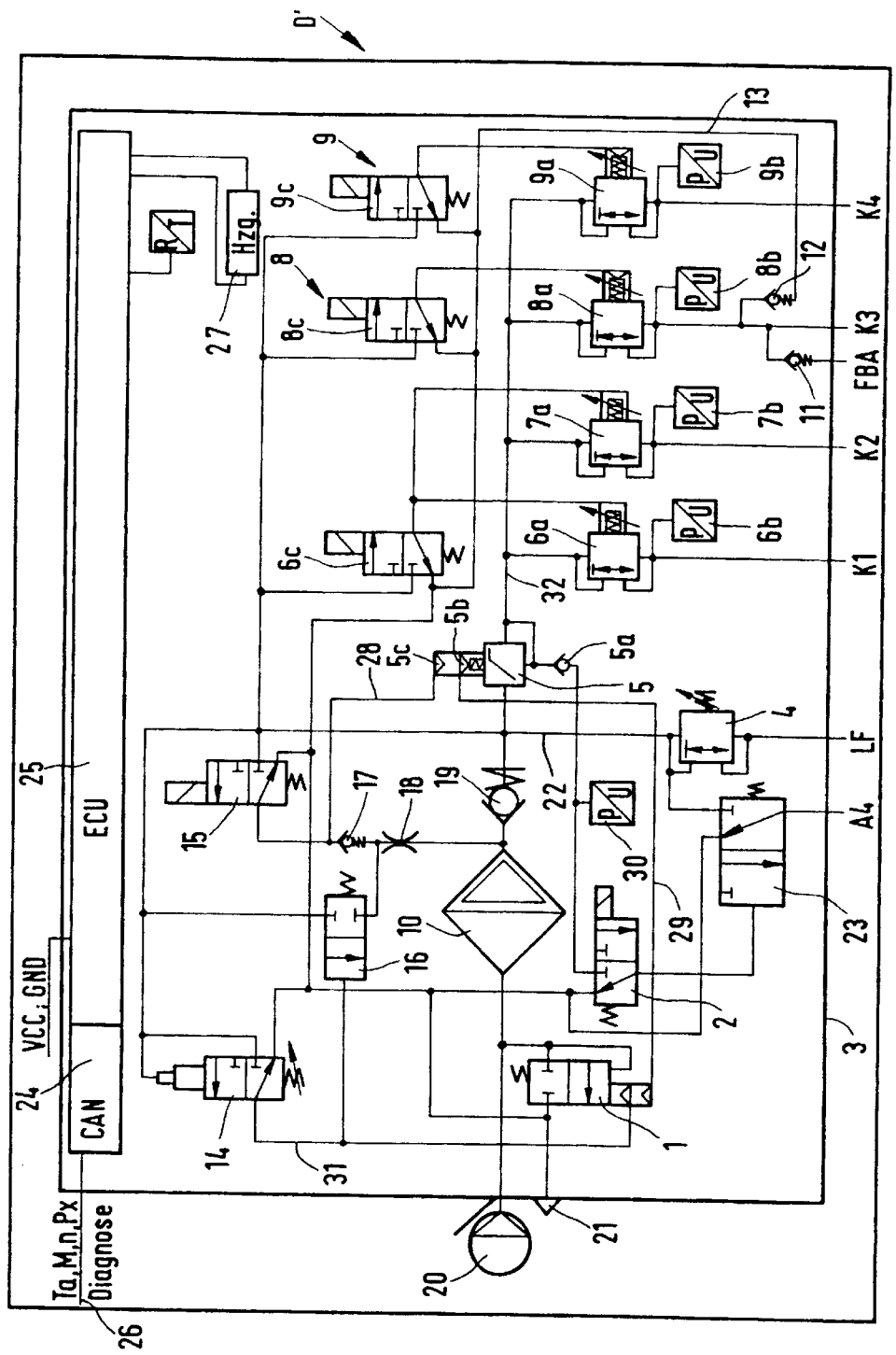
FIG. 3 is a connection diagram of another compressed-air processing system for an air-suspended vehicle.

FIG. 3 shows the embodiment of a compressed-air processing system D' according to the invention which is slightly modified in comparison to FIGS. 1 and 2, the same reference numbers as in FIGS. 1 and 2 indicating identical parts. Components and methods of operation which differ from the embodiment according to FIGS. 1 and 2 will be briefly explained in the following.

In contrast to the compressed-air processing system D of FIGS. 1 and 2, in the case of the compressed-air processing system D', the line 29 also leads into the control space of a pneumatic on/off valve 23 which is provided for controlling an energy-saving switching compressor LP in that a control line A4 can be rapidly ventilated and bled. The valve 23 will always have a flow when the pressure regulator solenoid valve 2 is excited for initiating a regeneration, so that the switching compressor, which would otherwise pump against the bleeding, can be switched off. As a result, energy is saved and the useful life of the compressor is extended.

An air suspension marked LF of the truck is also connected to the pressure regulator output hole 22 and can be locked by an electromagnetic overflow valve 4. The electronic control system 25 can provide, for example, that the overflow valve blocks the compressed-air suspension LF from the supply with compressed air from the pressure regulator output pipe 22 until a pressure sensor 30 arranged therein indicates that a pressure value has been reached which corresponds to a minimum pressure of the supply circuits. An adjustable spring 4b prestresses the overflow valve in the closing direction. The closing force of the spring 4b is canceled when a minimum pressure value set at the spring is exceeded, and the air suspension LF is supplied from the pressure regulator output hole 22. In this manner, it is ensured that, only after the buildup of a minimum pressure in the pressure regulator output hole 22, by which the supply hole 32 and the useful circuits K1–K4 are also supplied, has been concluded, compressed air is used for the air suspension LF. Subsequently, the pressure in the pressure regulator output hole 22 can be further increased.

Furthermore, a safety valve 12 for the overpressure protection is assigned to the pressure control unit 9 of circuit K3. Between the connection of K3 and the parking brake system FBA, another return valve 11 is arranged in order to, in the event of a line break in circuit K3, advantageously ensure a securing of the parking brake system FBA.

Finally, the pressure control units 6 and 7 are controlled by a common solenoid valve 6c, whereby a component is saved.

The invention was explained above by means of a multicircuit safety valve M, in the case of which four circuits K1–K4 could be separated from the pressure regulator output pipe 22 by means of the pressure limiter 5. As a result, a fully electronic control of the circuits is advantageously permitted which, in the event of a current outage or a similar occurrence, is absorbed by a securely functioning pneumatic control. However, it is also possible to construct the compressed-air processing system such that, because of the arrangement of the pressure limiter 5", the pressure control units 6, 7 and 8 (like the overflow valve 4 from FIG. 3) are acted upon directly by compressed air from the pressure regulator output pipe 22. The pressure control units 6 and 7 can—in contrast to FIG. 1—be constructed as magnetic overflow valves. In this modified type of installation, a pressure limiting takes place by means of the pressure limiter, which is arranged in front of the circuit K3, with respect to the output pipe 22.

In addition, it is advantageous for an air bleed valve for the parking brake system FBA to be provided in the circuit K3, by means of which air bleed valve, when the pressure tank is connected to circuit K2, this circuit can be bled into the open air. It is therefore possible to shut off the air bleed line leading to the parking brake system FBA on the other side of the air bleed valve and admit pressure only when in one or preferably in both service brake circuits K1, K2 the pressure was exceeded which is at least required for the residual braking effect of the vehicle. If the air bleed line is shut off, a filling of the pressure tank on circuit K3 is also possible and, as a result, the parking brake system FBA can then also be ventilated. For controlling the air bleed valve, a valve control pipe supplies the pressure of the service brake circuit K1 (or optionally of the service brake circuit K2) as control pressure to the air bleed valve.

To the extent that individual characteristics of the above-mentioned embodiments and variants were indicated, it is understood that they can easily be combined in an appropriate manner with the characteristics of the other embodiments and variants.

What is claimed is:

1. A compressed air processing system for motor vehicles, comprising:

an electromechanical pressure regulator and a multicircuit safety valve having at least one load circuit connected thereto, each load circuit being separately lockable by an assigned pressure control unit of a plurality of pressure control units, said pressure regulator and said multicircuit safety valve being disposed in a housing, and a pressure limiter arranged between at least one of the pressure control units and a pressure regulator output, wherein, in a zero-current condition, the pressure limiter limits a supply hole for at least one of the pressure control units to a defined output pressure, wherein the housing also comprises a pressure regulator solenoid valve for controlling the pressure regulator, wherein the housing also comprises a regeneration solenoid valve by which the pressure regulator is controlled, and wherein the pressure limiter has a two-circuit construction and is held in an open position by the regeneration solenoid valve and then by the pressure regulator solenoid valve.

2. The compressed air processing system according to claim 1 wherein the housing also comprises a pressure regulator pilot valve for controlling the pressure regulator.

3. The compressed air processing system according to claim 2 wherein the pressure regulator has an on/off safety valve which is pushed open in electric operation by a piston which is ventilated by the pressure regulator solenoid valve, and wherein, in a zero-current operation of the compressed air processing system, the on/off safety valve is pushed open by a second piston which is ventilated by the pilot valve.

4. The compressed air processing system according to claim 3 wherein the pressure regulator pilot valve of the pressure regulator is alternately blocked by the regeneration solenoid valve and the pressure regulator solenoid valve or a circuit pilot solenoid valve.

5. The compressed air processing system according to claim 4 wherein the housing also comprises a regeneration valve for controlling the pressure regulator.

6. The compressed air processing system according to claim 5 wherein a set pressure of the pressure regulator pilot valve is equal to or lower than a programmable switch-off pressure of the pressure regulator, and wherein the regeneration valve is ventilated or bled through a hole of the pressure regulator pilot valve in order to take over regeneration in said zero-current operation of the system.

7. The compressed air processing system according to claim 1 and further comprising a return valve arranged in parallel to the pressure limiter such that the return valve blocks air flow in the direction of a supply hole.

8. The compressed air processing system according to claim 1 wherein the multicircuit safety valve is mechanically adjustable.

9. The compressed air processing system according to claim 1 and further comprising a separate control piston by which a mechanical restoring force of the pressure control units is blockably adjustable.

10. The compressed air processing system according to claim 1 and further comprising an air dryer cartridge arranged between the pressure regulator and a pressure regulator output.

11. The compressed air processing system according to claim 10 and further comprising a return valve which blocks the air flow of the pressure regulator output in the direction of the air dryer cartridge.

12. The compressed air processing system according to claim 11 wherein, in parallel with the return valve, an expansion hole is provided for passing regeneration air through from the pressure regulator output in the direction of the air dryer cartridge.

13. The compressed air processing system according to claim 1 wherein said at least one load circuit is one of a plurality of load circuits, and further comprising an air bleed valve for a parking brake system provided in the housing, said air bleed valve being controllable by a valve control line via pressure of one of the load circuits such that air in a load circuit assigned to the parking brake system is bled into the open air.

* * * * *